June 12, 1962        M. L. LASKY ET AL        3,039,077
                     SONAR DOME UNIT Filed May 21, 1957                          4 Sheets-Sheet 1

INVENTORS
Marvin L. Lasky
Leo F. Fehlner,
BY George Sipkin
    B. L. Tungarell
                ATTORNEY

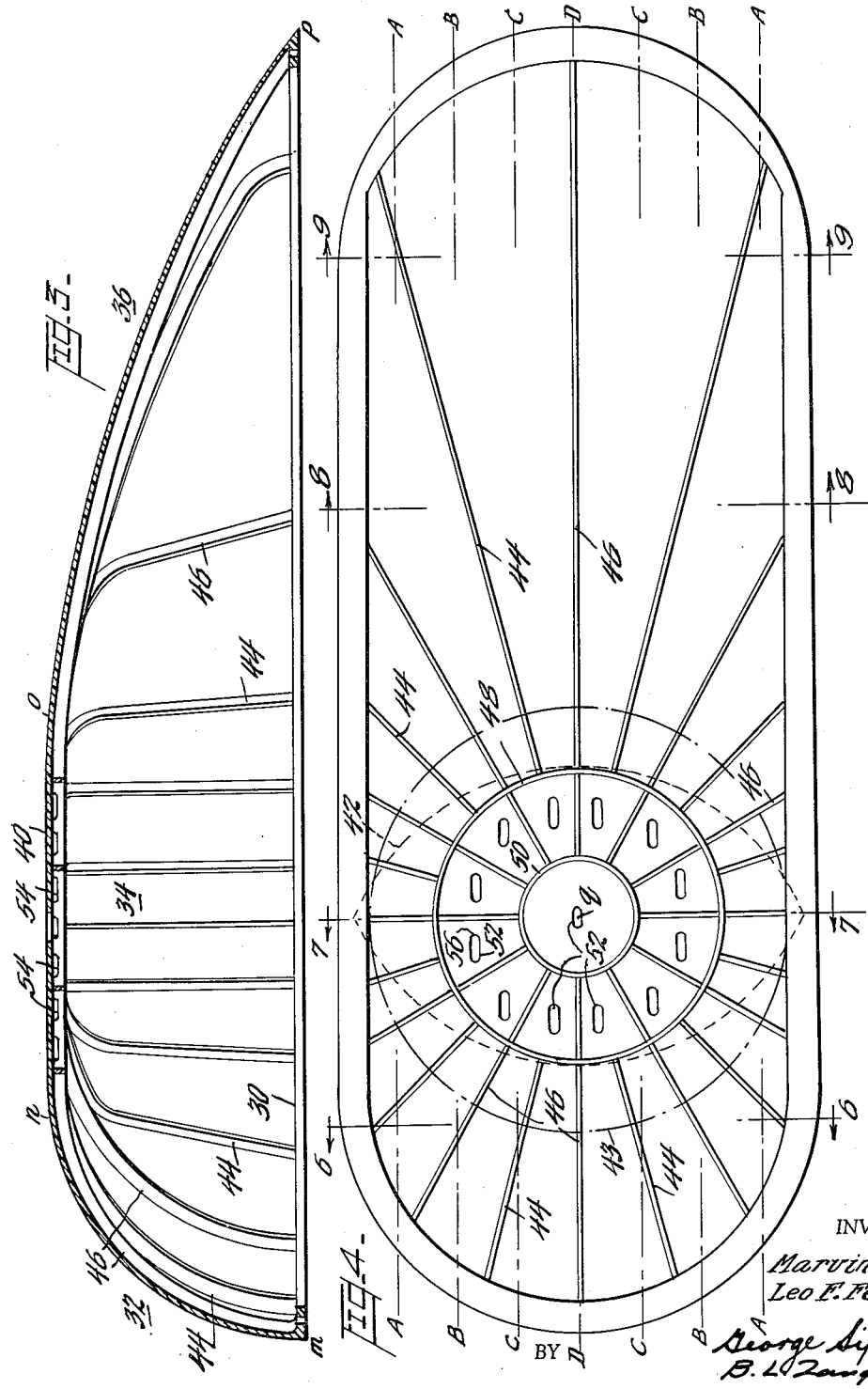

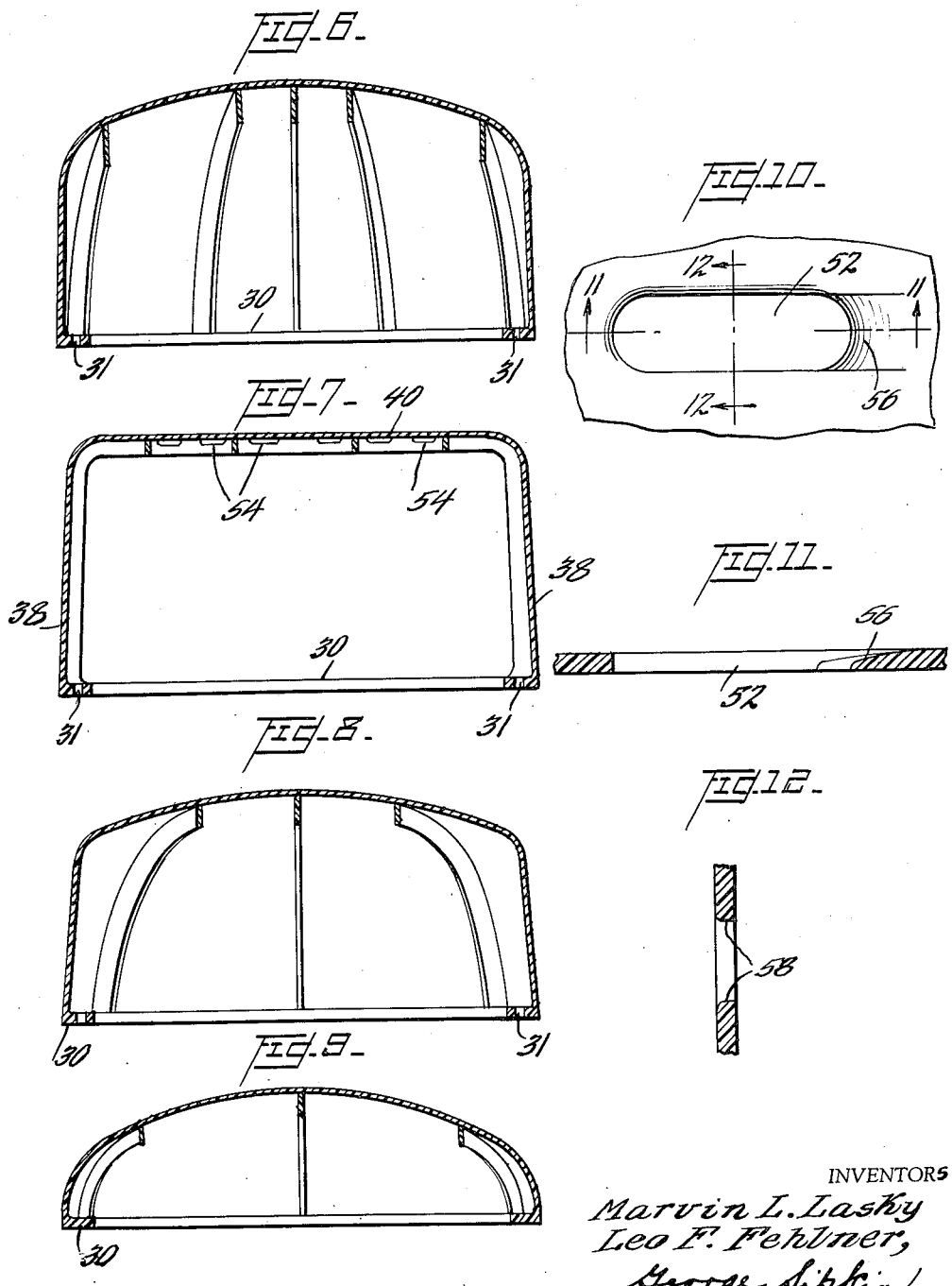

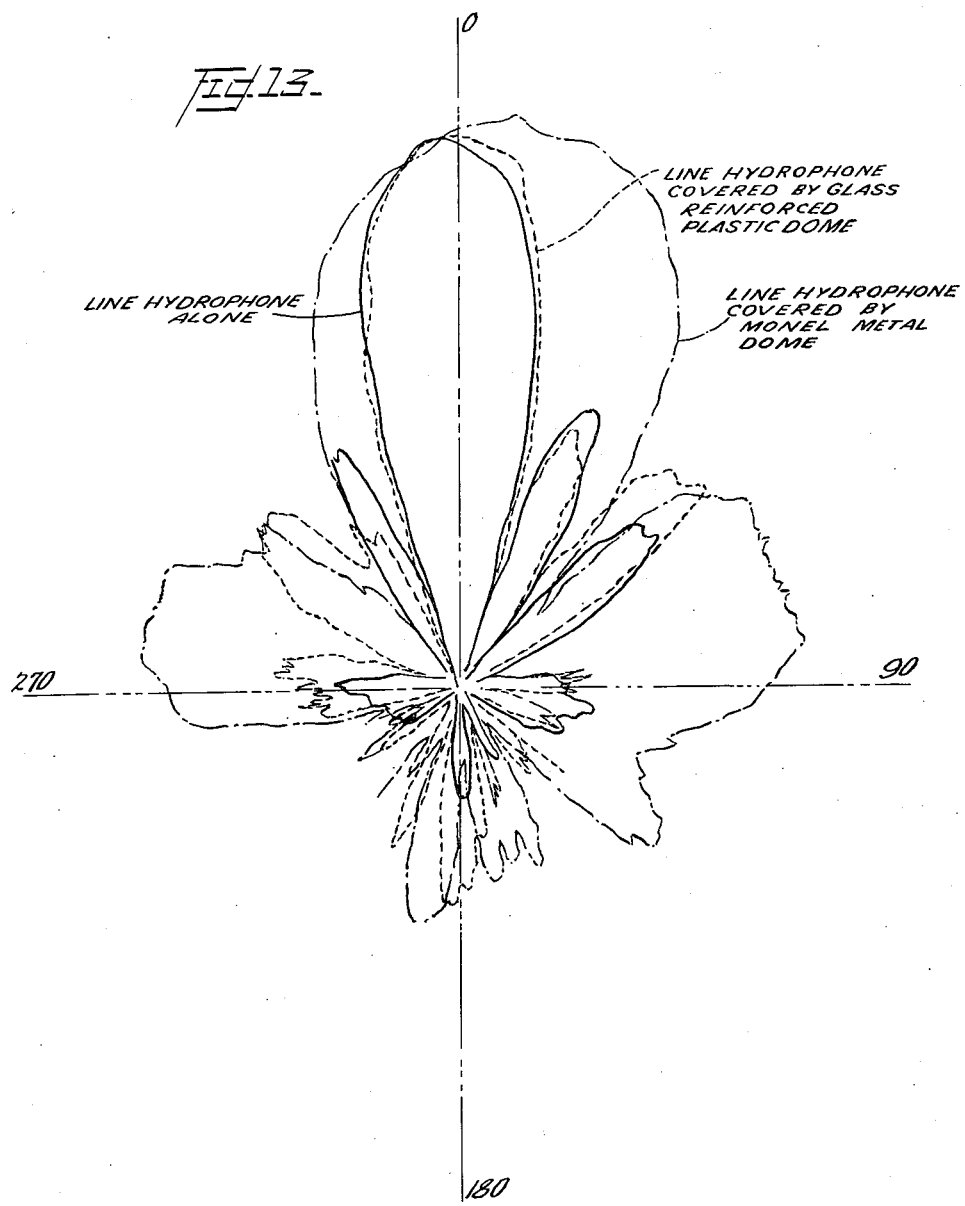

United States Patent Office 3,039,077
Patented June 12, 1962

3,039,077
SONAR DOME UNIT
Marvin L. Lasky, 4803 Montgomery Ave., Washington 16, D.C., and Leo F. Fehlner, 4308 Chestnut St., Bethesda 14, Md.
Filed May 21, 1957, Ser. No. 660,723
4 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates to sonar equipment of a type that introduces sonic waves into or receives such waves from a surrounding sea; and more particularly the invention relates to the sonar domes or blisters of sonar equipment used on ships, the sonar equipment being preferably of the type using a line hydrophone, but not limited thereto.

Line hydrophones of the prior art for underwater use on ships are limited in range and direction-sensitivity by background noises and vibration arising from such sources as the flow of liquid adjacent to or in contact with the hydrophone, and the moving parts and propulsion machinery of the ship. At high speeds of the listening ship, immersed line hydrophones of large size, in the order of three to five feet and more in length, are subjected to flow-induced background noises of such intensity and persistency as to make "listening to" or detection of other ships by sound virtually impossible. Attempts to improve upon the listening characteristics of such hydrophones usually take the form of adding "streamlining" baffles to their downstream sides, but such expedients are of limited benefit. For flow speeds above 5 knots, most exposed line hydrophones have to be retracted into the ship or aligned fore and aft to protect the hydrophone from damage caused by flow forces. Consequently these considerations limited size, design and use of line hydrophones.

An object of the invention is to provide equipment of a type described which permits the operational use of a large line hydrophone on sihps travelling at high and at low speeds.

Still another object of the invention is to provide improved sonar equipment comprising a hydrophone and sonar dome therefor that co-operate to provide effective and more efficient "listening" over a wide band of frequencies.

In accordance with the invention, a line hydrophone is encompassed by a specially made sonar dome or blister, the dome having features that, in turn, permit the use of an improved hydrophone. For example, when a line hydrophone is protected by the improved dome, the dome maintains a layer of quiescent water around the hydrophone and thus minimizes noise caused by gross flow effects arising from boundary layer action and represented by, for example, dipole, quadrapole, near field and far field radiation. Consequently, compromises in the design of the baffle for a line hydrophone for use in relatively moving water can be eliminated so that the hydrophone can be made more effective for suppressing undesired background noise signals which are produced by the ship's machinery and propulsion. Actually, the downstream baffle of the hydrophone can be made several times wider in a transverse direction than the conventional baffle. Such an expedient considerably improves the directional sensitivity of the hydrophone and hence its signal to noise ratio.

An object of the invention is to provide a sonar dome that can be made easily, cheaply, and quickly in any desired shape.

Another object of the invention is to provide a sonar dome of glass fibers and resin combination that requires a minimum of maintenance, that resists corrosion, and that can be easily repaired when damaged but that has a high strength to resist damage.

A further object of the invention is to provide a sonar dome having a shape that permits the mechanical rotation of a line hydrophone for "listening" through a full 360° without impairing the characteristics of a remote incoming signal.

Another object of the invention is to provide a sonar dome which has insignificant resonant amplitudes of vibration through a wide band of frequencies. In this connection, it is pointed out that the domes of the prior art, made of a steel and rubber or other materials or combinations thereof, have natural resonant characteristics that seriously interfere with sound reception, except in narrow frequency bands.

A most important object of the invention is to provide a sonar dome having an acoustic impedance that closely approximates that of surrounding sea water.

Briefly, a sonar dome in accordance with the invention comprises a thin shell constructed of plastic formed of a combination of a resin and glass fibers. The contour lines of the shell provide a low drag, while the curvature of the shell in the region of its use as an acoustic window is such that distortion and attenuation of received signals is minimized and over a wide frequency range. For practical reasons, the dome contains specially formed holes that permit rapid flooding of the dome, and the dome is so shaped that air is readily vented during flooding through the same holes. Additionally, the dome may be provided with internal, radial ribs that not only strengthen the dome but also define a convenient path along which the air may quickly travel to a venting hole.

Other objects and many of the attendant advantages of this invention will be readily appreciated as the same becomes better understood by reference to the following details and description when considered in connection with the accompanying drawings in which like reference numerals designate like parts throughout the figures thereof, and wherein:

FIG. 4 is a bottom view, to scale, of the dome, showing its vent holes and reinforcing ribs;

FIG. 5 is a composite longitudinal contour diagram of the shape of the dome on the lines A—A, B—B, C—C, and D—D of FIG. 4;

FIGS. 6, 7, 8 and 9 are transverse sectional views of the dome on lines 6—6, 7—7, 8—8, and 9—9, respectively, with certain ribs omitted for clarity;

FIGS. 10, 11 and 12 are, respectively and to scale, a plan view, a transverse sectional view and a longitudinal sectional view of a vent hole; and FIG. 13 is a diagram of horizontal directivity patterns of a line hydrophone without a dome, with a dome in accordance with the invention, and with a dome in accordance with the prior art.

Figure 1:
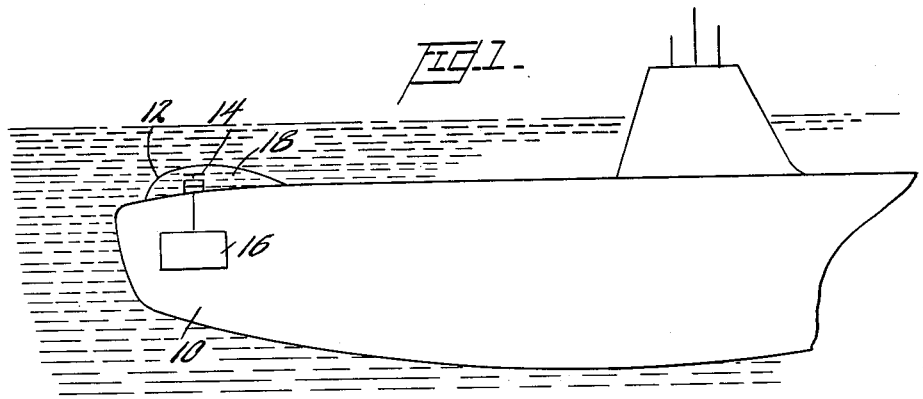
FIG. 1 is a schematic sketch of a part of an underwater craft having a sonar dome about a line hydrophone, in accordance with the invention.

Although not limited thereto, the invention is primarily for use with underwater vessels; and FIG. 1 schematically shows a submerged submarine 10 provided with sonar equipment comprising a sonar dome or blister 12 secured to the top of the submarine, a line hydrophone 14 within the dome, and electrical training mechanism 16 for angularly turning the hydrophone through a complete revolution or 360 degrees. The dome is provided with vent holes later described that permit the inside of the dome to become flooded with water 18 upon its submergence.

Figure 2:
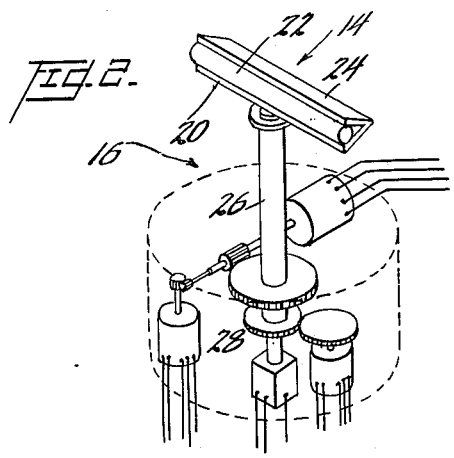
FIG. 2 is a fragmentary schematic diagram of a line hydrophone and training mechanism therefor utilizable in the invention.
Figure 3:
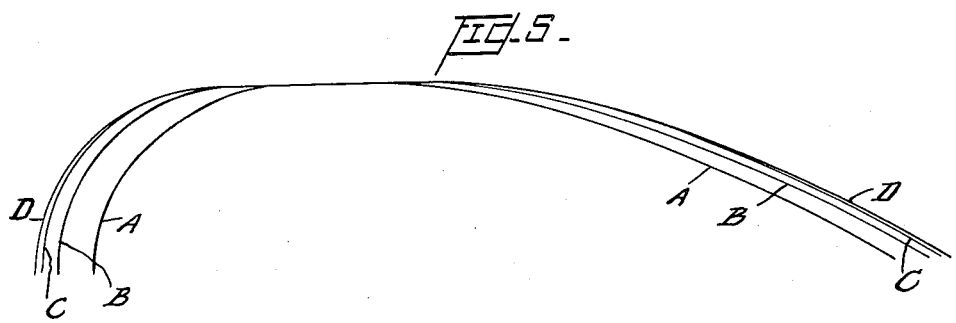
FIG. 3 is a longitudinal sectional view, to scale, taken through the center of the sonar dome.

The line hydrophone 14 and its training mechanism is shown in somewhat more detail in FIG. 2. The hydrophone comprises an elongated transducer portion 20 having a signalling face or side 22 and a baffle 24 of V-shaped cross-section on the downstream side or in back of the signalling side 22. Any conventional line hydrophone of the recited construction (an elongated transducer portion with a V-shaped baffle) is satisfactory. An example of such a hydrophone is the Navy JP type, described in an article by R. S. Lanier and C. R. Sawyer entitled "Sonar For Submarines," Electronics Magazine, April 1946, pages 99–103. The baffle 24 is used to make the transducer directional so as to reduce undesired background noise signals created by the ship's machinery, etc., which might mask the desired signal. By having the hydrophone in relatively quiet water, drag problems caused by flow are eliminated and the hydrophone can be designed acoustically without streamlining, resulting in a much wider baffle; and in a practicable embodiment this increase was threefold with respect to the width of a hydrophone for use without a dome.

The training mechanism 16 is connected to the hydrophone 14 by a hollow downwardly extending shaft 26 secured centrally thereto. The shaft is provided with gearing 28 to which are coupled various mechanisms including servo motors by which the position of the shaft at any time may be accurately ascertained and changed in a known manner. Similarly, conductors in the inside of the shaft electrically convey the signals of the transducer.

The hydrophone 14 and exposed parts of the training mechanism 16 are enclosed by the proximate portion of the outer hull of the submarine 10 and the sonar dome 12. To this end the dome 12 comprises an outer envelope having a peripheral inner flange portion 30 shaped to the hull portion, the flange having a plurality of holes 31 spaced therealong for receiving securing means such as bolts and nuts by means of which the dome is fastened to the hull.

The contour or shape of the dome can be varied in accordance with the ship to which it is to be attached and the type of hydrophone to be used therein; but in accordance with the invention important physical characteristics are imparted thereto as discussed below.

The dome material should be such that sound will pass through it, substantially undistorted. To this end, the density of the material should be such as to provide a matching "sound impedance" between it and the water in which it is immersed. This means that ideally the density of the material times the velocity of sound through the material should be equal to the density of water times the velocity of sound through the water. Glass reinforced plastic is used for the domes in accordance with the invention; this material closely approximating the acoustic impedance of water.

The dome should have a minimum of drag. To this end the dome 12 should be streamlined or faired as far as possible, and the vent holes in it should be similarly finished. However, this consideration is modified to some extent by the need for making the dome acoustically efficient for its purposes. This is easily accomplished because of the ease of making a dome out of glass fiber reinforced plastic. The ease of fabricating permits complex shapes to be fabricated so that the dome can be made to conform to optimum hydrodynamic (low-drag) considerations as well as acoustic considerations.

The shape, comprising curvature and thickness, should be such that wanted signals pass through it whereas noise comprising sound other than the signals, are attenuated, i.e., pressure fluctuations in the boundary layer of the dome are rapidly attenuated whereas desired signals from remote targets are unaffected. The curvature is a factor in fixing the critical angle of the sound wave passing through the sonar dome, and the curvature should be such that the wanted signal coming from the trained direction of the hydrophone passes through the minimum of distortion or absorption.

Assuming a suitable curvature, the thickness of the material and the arrangement of the glass fibers in the dome are also factors in signal to noise attenuation ratios. Preferably, the glass fibers are arranged in parallel layers and constitute the major part of the dome; and the thickness for a given dome is dependent on the frequency range of the signals. For optimum results, a thickness of about ⅜ inch is recommended for the 50–40000 cycle range, ½ inch for 50–20000 cycles and ¾ inch for 50–8000 cycles. The dividing line is not sharp; and a one inch thick dome gave negligible signal attenuation (less than 2 decibels) in a signal range of 50–10000 cycles.

In the embodiment disclosed, the dome size is determined on the basis of the particular hydrophone to be used inside of it, and preferably should be as small as possible within the limits of streamlining and proper operation of the combination as a listening means and as a drag on the ship's motion. In general, the clearance between the transducer face of the hydrophone in any of its positions and the sonar dome should be such as to provide space for enough reflection, deflection, and absorption to attenuate the boundary layer noise effects and the pressure fluctuations on the dome before they become manifest on the transducer.

The combination of the dome and line hydrophone has, in summary, the operational advantage of removing detrimental flow forces from the hydrophone while protecting it with a layer of quiescent water. Accordingly there are no dynamic water-flow forces or drag on the hydrophone so that it can be trained much easier and operates more quietly. Hence, it can be made larger.

FIGS. 3–12 show a sonar dome construction for a particular application in which the base line dome length, that is, its longest longitudinal dimension, was twelve feet, measuring to the nearest one-half inch. In addition to the inner flange 30, the dome 12 comprises a front end or portion 32, an intermediate portion 34 and a back or trailing end or portion 36. By way of identification only, and not as any sort of limitation, the front end may be said to be that part of the dome that lies between parallel planes perpendicular to the longitudinal axis of the dome and passing through points $m$ and $n$; the intermediate portion being that part between similar planes through point $n$ and $o$, and the back end between similar planes through points $o$ and $p$.

As may be observed from FIGS. 6, 7 and 8, the intermediate portion 34 (FIG. 7) in transverse section has curved corners between substantially straight sides 38 and a top 40. A large part of top 40 is flat, and the broken line oblong 42 in FIG. 4 indicates the flat part of this top 40. In the preferred embodiment, the top is also the highest part of the dome.

The front end 32 slopes longitudinally forwardly with increasing steepness from the top 40 until, at the bottom, the slope is practically vertical, as indicated by the forward portions of lines A, B, C and D of FIG. 5. The front end 32 of the dome may be called blunt-nosed because backwardly it rises quickly to the top of the dome. The back end 36 also slopes longitudinally backward from the top 40 with increasing steepness, but with a considerably lesser change in slope than that of the front portion so that the back end is longitudinally faired.

The dome is symmetrical about the center longitudinal contour line D; and the sides of the domes are of gradually decreasing height in a backward direction because of the gradual longitudinal slope of the contour lines A, B, C and D backwardly. Moreover, the top of the back end becomes transversely more rounded in a backward direction, as indicated in FIG. 9, so that the dome is also transversely faired.

With the sonar dome described, the hydrophone 14 is placed about at the quarter point backwardly from the front point of the dome. With respect to FIG. 4 the center of the hydrophone is preferable at point $q$, and the broken line circle 43 represents the turning diameter of the hydrophone.

As a general rule, the minimal distance of any active section of the hydrophone should be four to six inches away from the nearest point of the dome wall in order to remove the hydrophone from the near field excitation of the higher frequencies. For lower frequencies of near field excitation of about 5 kilocycles, greater clearances are desirable.

The dome may be made in known manner with shaped male and female molds having glass fiber mattes therebetween, and suitable resin forced between the molds, either by vacuum or pressure or both, to fill all remaining space between the molds. A utilizable method is disclosed in U.S. Patent No. 2,495,640, dated January 24, 1950, to Muskat.

The dome can also be hand laid up on a male mold. This method involves the placing and impregnating of successive layers of glass fiber cloth against the resin-coated surface of the laminate. In order to obtain a tight and void-free laminate, resin which has thixotropic characteristics is first painted on the prepared surface of the mold and allowed to jell. A second heavy coating of resin is applied to the surface and a layer of glass fiber cloth is placed and pressed gently against it. The resin is allowed to soak into the cloth, and after a short time (approximately five minutes) a squeegie is passed over the surface to force out any entrapped air and to remove excess resin. A new coat of resin is applied and the lay-up process repeated until a laminate of the desired thickness is obtained. The thickness of the laminate is determined by the number of layers of cloth used. When using this method a thermal setting plastic is generally required and the heat necessary for jelling is generated from chemical accelerators added to the plastic just before its use. The surface may be given a lacquer finish which is subsequently polished, waxed, and finally buffed to assure smoothness. A high degree of smoothness is desirable in order to minimize self-created noises such as may be generated by eddies and the like during movement of the dome through water. If desired coloring material may be added during the fabrication of the dome without deleterious effects on operating properties and characteristics.

Glass fiber cloth mattes of 1044 mesh have been found practicable; and the dome should have as much of the glass fiber as the manufacturing process permits, forty to sixty percent of glass fiber in the dome yielding most effective acoustic impedances.

In order to minimize interference with the smooth passage of sound waves through the dome, voids or air pockets in the materials should be avoided. For the same reason it is desirable to avoid alignment of the edges of the mattes. This can be done by staggering them, preferably by laying successive mattes at different angles, for example 45° or 90°, so that there is very little overlapping of joints.

An immersed sonal dome is subject to larger physical and dynamic forces, e.g. about ten tons at twenty knots for the dome described, and considerably more during slamming. For this and other reasons, it is sometimes desirable to strengthen the sonar domes, especially those with relatively thinner walls. To this end, the dome may be provided with a plurality of outwardly and downwardly spreading, contour-following, radial ribs 44 and 46; the ribs 44 extending between flange 39 and an outer circular rib 48, and the ribs 46 extending between flange 30 and an inner circular rib 50. All ribs are of the same composition as the sonar dome, being bonded or cemented with plastic to the inside of the dome.

When the dome is used on the top of a submarine, the part of the outer hull covered by the dome usually has holes through which the dome readily fills and drains. Also, access holes may be provided.

In order to permit thorough and rapid flooding or filling of the dome with water when the dome is first submerged, a plurality of spaced faired vents 52 are provided in the uppermost part of the dome; and a plurality of openings such as 54 are provided in the top parts of a number of the ribs. Thus, each of the circular ribs 48 and 50 has at least a part of an opening 54 on each side of the point of juncture of each radial rib. Inner surface finish of the dome including its ribs should be smooth and free of rough edges that may either entrap air or provide means for air bubbles to adhere to structures. The vents 52 are longitudinally parallel and extend fore and aft. As shown in FIGS. 9–12, each vent 52 has its back end 56 faired, and its sides 58 rounded so as to minimize its drag to motion.

The number of vents should be kept to a minimum consistent with reasonably fast flooding and venting. The size should not be so large as to create a wake with a high Reynolds number on the downstream side. Overly larger holes are also objectionable because of the possibility of orifice excitation caused by the relative flow of water past the orifice. (Helmholtz resonator effects.)

An indication of the effectiveness of sonar equipment provided with the invention may be gathered from FIG. 13 in which the solid line is the horizontal directivity pattern at five kilocycles of a line hydrophone alone submerged in quiet water. The short dash broken line is the pattern of the same hydrophone under the same conditions but covered by a one-half inch plastic dome in accordance with the invention; and the dot-dash line is a pattern with the same hydrophone under the same conditions but covered with a prior art dome of Monel metal. All curves are with the hydrophone trained along the longitudinal axis of the dome.

It is to be noted that the plastic dome produces very little change in the pattern, and most of the change occurs in the side lobes. However, the Monel dome greatly widens the lobes, materially decreases the directiveness of the main lobe, and also broadens the side lobes which are at right angles to the main lobe.

It was also found that the directional patterns of the hydrophone alone and of the hydrophone and plastic combination changed insignificantly and did not shift more than about two degrees when the dome bow was turned at different angles, up to one hundred and thirty-five degrees, relative to the line of the hydrophone; whereas the lobes of the pattern with the Monel and hydrophone combination not only broadened out significantly but shifted considerably, as much as twenty angular degrees, with respect to FIG. 13, when the Monel dome bow was turned with respect to the hydrophone in the same way as was the hydrophone and plastic combination.

Obviously many modifications and variations of the present invention are possible in the light of the above teachings. It is therefore to be understood that within the scope of the appended claims the invention may be practiced otherwise than as specifically described.

What is claimed is:

1. A sonar dome unit comprising a line hydrophone having an elongated transducer face in front of an elongated V-shaped baffle in the back for producing a directional effect, means enclosing said hydrophone, said means comprising a nonresonant dome of glass fiber reinforced plastic and providing an acoustic window when filled with water, said dome having a blunt-shaped forward nose, a faired tail end, and an intermediate portion, said intermediate portion including means for venting air bubbles from the top of said dome; means for mounting said hydrophone with its center point about the quarter point of the length of said dome measuring from its forward-most point, and means for variably training said hydrophone inside said dome and about said center point.

2. A sonar dome unit as defined in claim 1 but further characterized by the inside of said dome having a plurality of spaced reinforcing ribs formed of said glass fiber reinforced plastic, the upper parts of said ribs having vent holes.

3. A sonar dome unit as defined in claim 1 wherein said means for venting air bubbles from the top of said dome are a plurality of vent holes.

4. A sonar dome according to claim 3 but further characterized by said dome being longitudinally faired from the inner edge to the outer edge of said holes at the trailing edge of said holes whereby a smooth flow of water may be obtained past said holes without orifice noise excitation.

References Cited in the file of this patent

UNITED STATES PATENTS

| | | |
|---|---|---|
| 2,383,415 | Polydoroff | Aug. 21, 1945 |
| 2,407,330 | Turner | Sept. 10, 1946 |
| 2,420,676 | Peterson | May 20, 1947 |
| 2,434,666 | Mason | Jan. 20, 1948 |
| 2,444,911 | Benioff | July 13, 1948 |
| 2,472,107 | Hayes et al. | June 7, 1949 |
| 2,578,678 | Dudley | Dec. 18, 1951 |
| 2,642,920 | Simon et al. | June 23, 1953 |
| 2,658,186 | Mason | Nov. 3, 1953 |
| 2,750,589 | Harris | June 12, 1956 |
| 2,755,216 | Lemons | July 17, 1956 |
| 2,797,399 | Camp et al. | June 25, 1957 |
| 2,832,944 | Kessler | Apr. 29, 1958 |
| 2,854,668 | McMillan et al. | Sept. 30, 1958 |

FOREIGN PATENTS

| | | |
|---|---|---|
| 581,739 | Great Britain | Oct. 23, 1946 |

OTHER REFERENCES

"Sonar Calibration Methods," p. 156, 1946 (QC 233 V6b C. 2).

Koch: Aviation Week, Dec. 12, 1955, p. 136.